J. H. GILLELAND.
COTTON-CHOPPER.

No. 185,916.   Patented Jan. 2, 1877.

WITNESSES:
E. Wolff
J. H. Scarborough

INVENTOR:
J. H. Gilleland
BY
ATTORNEYS.

N. PETERS, PHOTO-LITHOGRAPHER, WASHINGTON, D. C.

UNITED STATES PATENT OFFICE.

JOHN H. GILLELAND, OF PEAK'S HILL, ALABAMA.

IMPROVEMENT IN COTTON-CHOPPERS.

Specification forming part of Letters Patent No. 185,916, dated January 2, 1877; application filed October 14, 1876.

*To all whom it may concern:*

Figure 1:
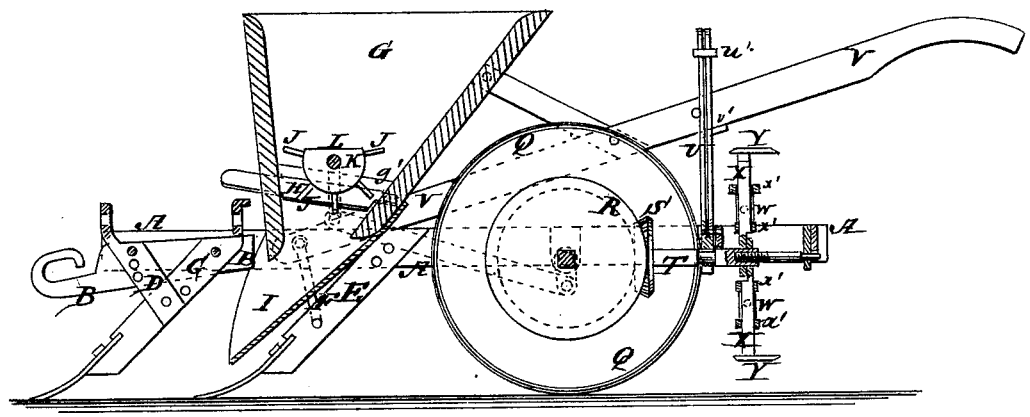
Figure 2:
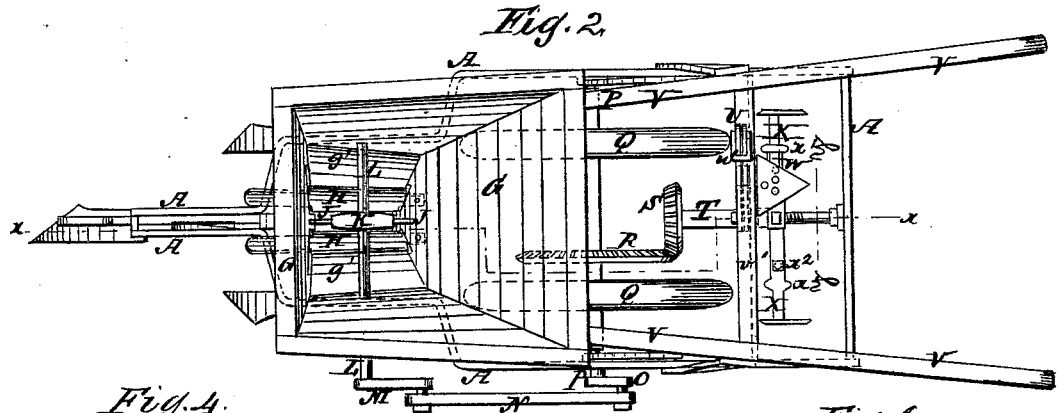
Figure 4:
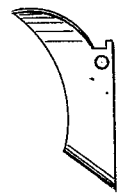
Figure 3:
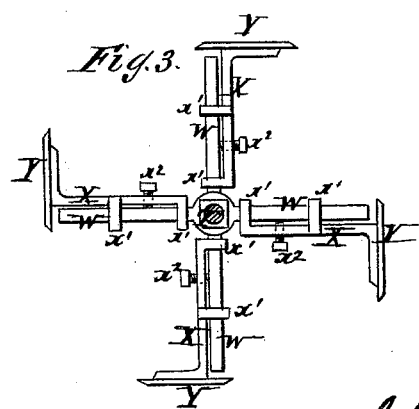
Figure 6:
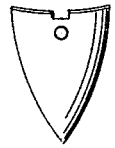
Figure 5:
Figure 7:

Be it known that I, JOHN H. GILLELAND, of Peak's Hill, in the county of Calhoun and State of Alabama, have invented a new and useful Improvement in Cotton - Chopper, of which the following is a specification:

Figure 1 is a vertical longitudinal section of my improved machine, taken through the line $xx$, Fig. 2. Fig. 2 is a top view of the machine. Fig. 3 is a detail view of the chopping device, the shaft being shown in section through the line $yy$, Fig. 2. Fig. 4 represents a turn-plow. Fig. 5 represents a sweep. Fig. 6 represents a shovel-plow. Fig. 7 represents a modified form of the chopping-hoe.

Similar letters of reference indicate corresponding parts.

The invention will first be described in connection with the drawing, and then pointed out in the claims.

A is the frame of the machine, the forward ends of the side bars of which are bent forward, so as to be parallel with and at a little distance from each other, and have holes formed through them to receive the bolts by which the draw-bar B, the plow-standard C, and the brace D are secured to and between said ends. The lower end of the brace D is secured to the middle part of the standard C by a bolt. Several holes are formed in the standard C and brace D to receive the fastening-bolts, so that they may be adjusted to cause the opening-plow to run deeper or shallower in the ground, as may be desired. E are the standards of the plows that cut the soil on each side of the row of cotton-plants, so that the intermediate part may be easily cut out by the chopper, except where the plants are intended to stand, which are bolted to the side bars of the frame A, and the draft-strain upon them is sustained by the braces F. The upper ends of the braces F are secured to the side bars of the frame A, and their lower ends are secured to the standards E. Several holes are formed in the standards E to receive the fastening-bolts, so that they can be adjusted to work at any desired depth in the ground.

To one of the wheels Q is attached a bevel-gear wheel, R, into the teeth of which mesh the teeth of a smaller bevel-gear wheel, S, attached to the forward end of the shaft T. The rear end of the shaft T revolves in bearings attached to the center of the rear cross-bar of the frame A. U are two levers, which are pivoted, near their lower ends, to each other and to a cross-bar of the frame A, so as to work upon each other like the parts of a pair of scissors. In the adjacent faces of the lower ends of the levers U are formed half-round notches, which, when the said ends are closed upon each other, form a bearing for the forward journal of the shaft T. The upper ends of the levers U are held together by a link, $u'$, slipped upon them, and are held in place to hold the wheel S in gear with the wheel R by entering a notch in the round or cross-bar $v'$, that connects the handles V. This construction enables the chopper to be easily detached when desired. To the shaft T, between the cross-bars of the frame A, are attached, by means of a hub or other suitable device, four radial arms, W, upon the forward sides of which are placed the chopper-standards X. Upon the chopper-standards X are formed two loops or keepers, $x^1$, which are slipped upon the arms W, and the said standards X are then secured in place by set-screws $x^2$, which pass through the said standards, and press against the said arms. This construction enables the chopping-hoes to be easily adjusted as required.

The outer ends of the standards X are bent over at right angles to form seats for the chopping-hoes Y, and have two holes formed in them to receive the bolts by which said hoes are secured in place. The hoes Y are made in the shape of equilateral triangles, as shown in Fig. 2, and are attached to their seats with an angle forward, as shown. Three holes are formed in the hoes Y, to receive the bolts and enable the hoes to be adjusted with another angle forward, as the angle in use becomes dull.

If desired, the hoes Y may be made in rectangular form, as shown in Fig. 7. In this case four holes should be formed in the hoes to receive the fastening-bolts, so that the said hoes may be secured to their seats with either angle forward.

Having thus described my invention, I claim as new and desire to secure by Letters Patent—

1. The levers U, pivoted to each other near their lower ends, and together forming a bearing for the chopper-shaft, as shown and described.

2. The combination of levers U, link $u'$, and notched cross-bars $v'$ with the wheel S, as and for the purpose set forth.

JOHN H. GILLELAND.

Witnesses:
HENRY F. MONTGOMERY,
WILL M. HAYNES.